United States Patent [19]  [11]  4,142,460
Standing et al.  [45]  Mar. 6, 1979

[54] APPARATUS FOR PREPARING CRUNCHY FOOD TOPPING

[75] Inventors: Charles N. Standing, Minneapolis; Timothy F. Scrivner, New Hope, both of Minn.

[73] Assignee: The Pillsbury Company, Minneapolis, Minn.

[21] Appl. No.: 846,962

[22] Filed: Oct. 31, 1977

[51] Int. Cl.² ............................................. A21B 3/07
[52] U.S. Cl. .................................... 99/353; 83/651.1; 99/443 C; 241/277; 241/294
[58] Field of Search ................ 99/352, 353, 355, 356, 99/443 C; 426/503; 241/191, 277, 294; 83/651.1

[56] References Cited
U.S. PATENT DOCUMENTS

| 2,623,480 | 12/1952 | Stiles | 426/503 |
| 2,953,307 | 9/1960 | Lykken | 241/191 X |
| 3,066,877 | 12/1962 | Sawyer | 241/191 |
| 3,132,949 | 5/1964 | Crowe | 99/353 X |
| 3,789,750 | 2/1974 | Beck | 99/353 |

Primary Examiner—Billy J. Wilhite
Attorney, Agent, or Firm—Michael D. Ellwein; Mart C. Matthews

[57] ABSTRACT

A method and an apparatus is described for preparing a crunchy food topping of random sized pieces or granules of cooked dough in which the dough is mixed, subdivided to random sized pieces or granules, baked, allowed to cool, sized and packed. The granules can then be applied to a food product, e.g., a dessert such as pie, cake, pudding, etc., by hand. The random sized pieces or granules are prepared within a dough-containing trough or hopper having a rotating cutting or comminuting device, e.g., wires near its bottom end. These wires are supported upon spokes which are mounted rigidly upon a rotating drive axle near the bottom of the hopper. The hopper has an outlet at the bottom through which the granules exit to a conveyor used for transporting them to a baking oven.

5 Claims, 5 Drawing Figures

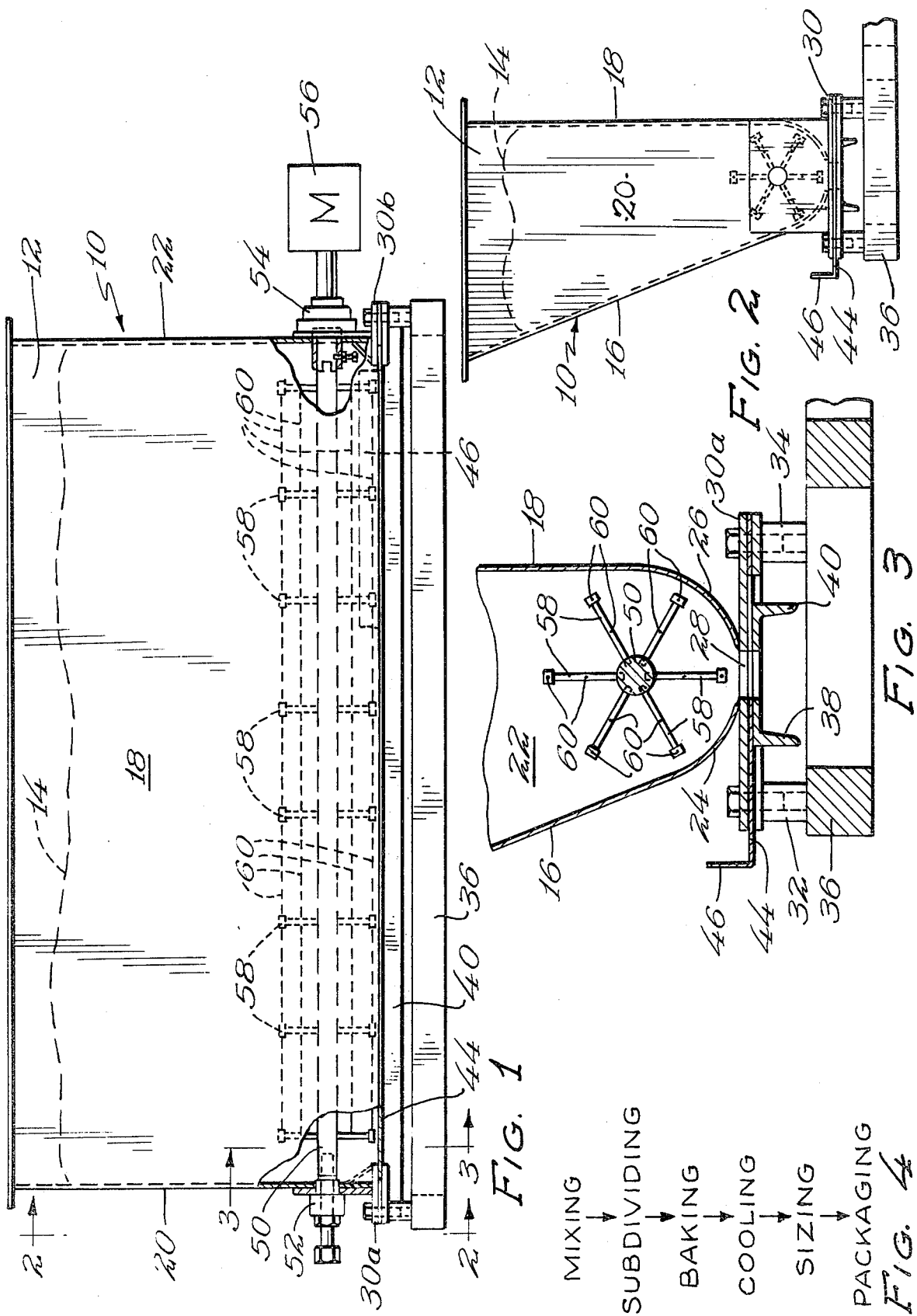

APPARATUS FOR PREPARING CRUNCHY FOOD TOPPING

FIELD OF THE INVENTION

The invention relates to food products and more particularly to the preparation of crunchy food granules.

THE PRIOR ART

Crunchy topping granules formed from a dough base can only be prepared with difficulty using available equipment and the results are almost always totally unsatisfactory. For example, when the dough is prepared by passing it through a corrugated roll feeder, the pieces have the form of extruded plugs instead of a random continuous bed of particles and the rotation of the feeder rolls causes greasing out of the fat contained in the dough. This is, of course, unsatisfactory. An attempt was made to use what is known in the art as a "wire-cut" machine. The "wire-cut" machine consists of an extruder having a plurality of cookie dies provided with an oscillating wire cutter mounted to reciprocate back and forth through the extruded material issuing from the die cutting it into pieces. It was found that channels formed within the interior of the product and the resulting granules were too hard. The product also tended to be either too dark or too moist and again, the greasing out of fat produced an undesirable sheen. In the development of the present invention, an attempt was made also to use a "rotary" cookie depositing machine, a dough shredder, vibratory feeders, flour sifters, pharmaceutical granulators, etc., in all cases with unsatisfactory results. Thus, in addition to producing an unsatisfactory product, the equipment is relatively complicated in construction, and expensive.

OBJECTS

In view of these and other deficiencies of the prior art, the major objective of the invention is to provide an improved method and apparatus for producing crunchy food topping granules having the following characteristics and advantages: (a) provision for producing random sized pieces, (b) satisfactory production without greasing out of fat, (c) the provision of an apparatus including elements which co-act to both cut the product into random sized pieces and convey it downwardly for further processing, (d) provision for controlling the flow of prepared granules out of the comminuting apparatus to simulate hand feeding, (e) provision within the apparatus for positive downward transfer of material with little or no working of the material during the subdividing operation, (f) little or no sheeting of the material within the cutter and provision for preventing jam-ups while the cutter and apparatus for subdividing the dough into granules is in operation.

In the accomplishment of the foregoing and related advantages and objectives, this invention then comprises the features hereinafter fully described and particularly pointed out in the claims, the following description setting forth in detail certain illustrative embodiments of the invention these being indicative, however, of but a few of the various ways in which the principles of the invention may be employed.

THE FIGURES

FIG. 1 is a side elevational view of a comminuting and feeding apparatus in accordance with the invention.

FIG. 2 is an end elevational view taken on line 2—2 of FIG. 1.

FIG. 3 is a partial vertical sectional view taken on line 3—3 of FIG. 1 on a somewhat larger scale.

FIG. 4 is a flow chart illustrating the steps performed in a preferred form of the invention.

SUMMARY OF THE INVENTION

Figure 5:
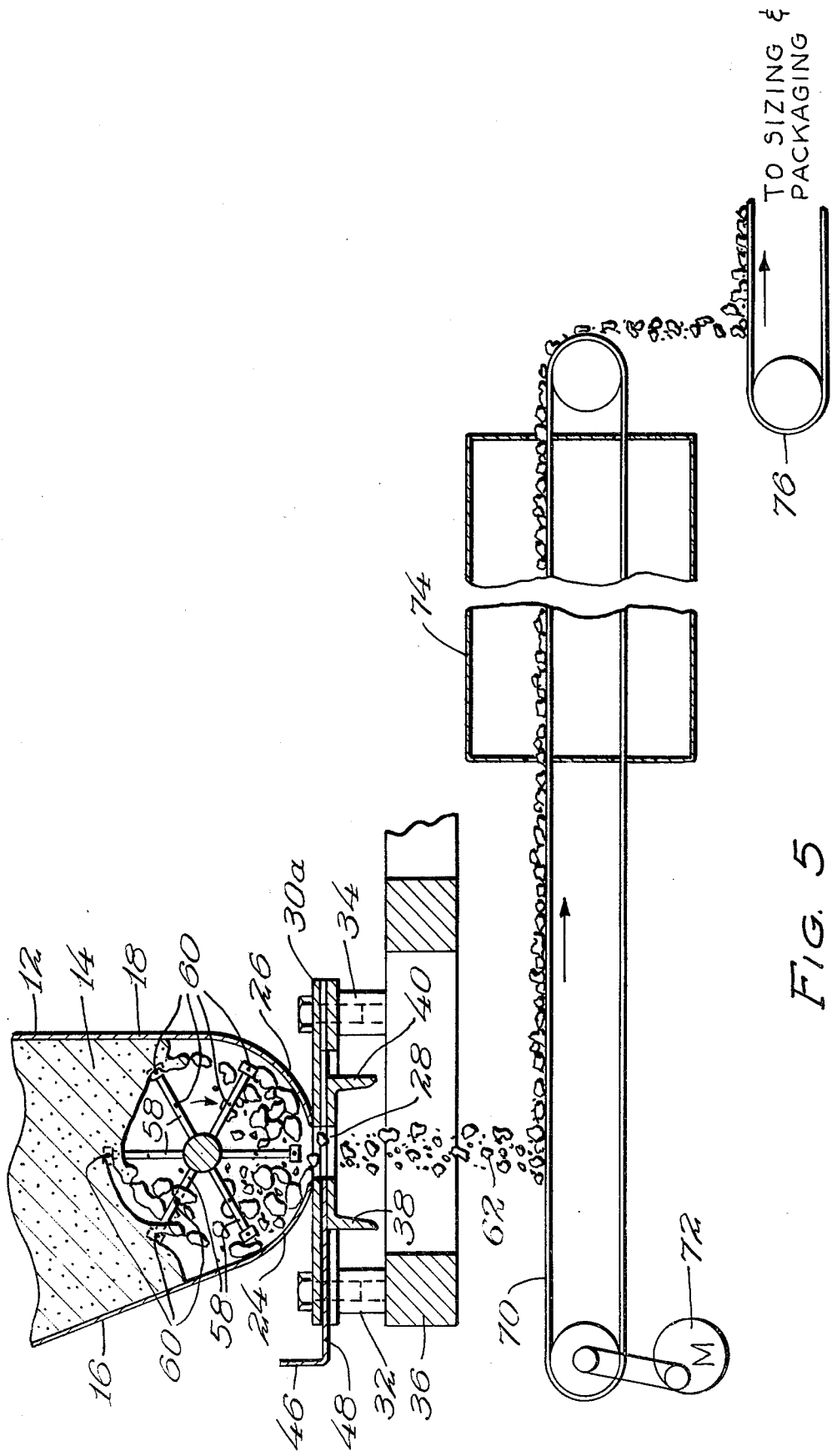
FIG. 5 is a view similar to FIG. 3 but in addition illustrating the material flow through the cutter feeder and oven.

A crunchy food topping is prepared by mixing a plastic food mass or dough, subdividing the mass into pieces of random size, baking the pieces and optionally, cooling, sizing, and packaging the resulting pieces.

More specifically, the mass of dough is preferably subdivided by drawing an elongated relatively narrow cutting or comminuting implement through the surface of the dough to remove a surface layer, thereafter chopping the removed surface layer into pieces of random size with this or other elongated cutting implements. The pieces are then cooked or baked. After being baked, the pieces are optionally allowed to cool, sized and packaged. The preparer of a food product such as a dessert can distribute the granules by hand over the top either before or after baking.

In a preferred form of the invention, the granules or pieces are prepared by placing the mass of food material while in a plastic condition in a trough or hopper provided with a rotating wire cutter at the bottom thereof. The wires can be supported on spokes projecting from a rotating drive shaft or axle mounted at the bottom of the hopper. The hopper has an outlet at the bottom through which the granules fall onto a conveyor used to carry them to the baking oven.

DETAILED DESCRIPTION

In accordance with the present invention, a crunchy food topping of granular texture having random sized pieces is prepared by placing an edible plastic food material or dough 14 within a comminutor or feeder indicated generally by the numeral 10. The dough can have any suitable formula but any suitable sweet dough formula can be used with or without flavors such as cinnamon, caramel, peanut butter, etc. The unit 10 will, for convenience, be referred to as the feeder. The dough is top loaded into the feeder 10 and during operation is kept more or less full. As seen in the FIGS., the feeder includes a hopper or trough having an inclined side wall 16 positioned in a plane parallel to the longitudinal axis of the hopper and an opposing vertical wall 18. These walls are connected at their ends by vertically disposed end walls 20 and 22. The hopper 12 is opened at its top and closed at its bottom ends by means of centrally curved lower edges 24 and 26 of the side walls 16 and 18 which together form a semi-cylindrical trough having a central longitudinally extending rectangular opening 28 (FIG. 3). The hopper 12 is supported upon a base or bracket 30 having left end 30a and a right end 30b as seen in FIG. 1 which are themselves supported upon four vertically disposed longitudinally and laterally spaced apart spacers 32, 34, the spacers being in turn fastened on a framework 36 by bolts or other suitable fasteners. Suitably affixed at their ends to the brackets 30a and 30b are longitudinally extending supporting beams such as angle irons 38, 40 (FIGS. 3 and 5) which define in part the opening or discharge slot 28. The ends of the angle iron 38, 40 can be affixed in any suitable manner as by welding to the brackets 30a and 30b. Besides forming the discharge opening 28, the frame members 38, 40 also help to support the hopper 12.

Slidably mounted above the frame members 38, 40 defining slot 28 is a discharge gate 44 having a handle 46 enabling it to be manually slid either to the right or left as seen in FIG. 3 to thereby either close or open the discharge port 28. It can thus be seen that the gate 44 slides upon the upper surfaces of the angle irons 38, 40 and against the lower surfaces of the bracket members 30a and 30b. By moving the gate toward the right as seen in the figures, the product is discharged more slowly and cut into smaller pieces prior to being discharged.

Mounted for rotation within the hopper just above the discharge slot 28 is a rotating comminutor or cutter unit comprising a longitudinally extending axle shaft 50 journaled for rotation in bearings 52 and 54 supported upon end walls 20 and 22 respectively. With the end projecting through bearing 54 being operatively connected to a drive motor 56 for turning the shaft at a relatively slow speed, for example from 3 to 60 rpm.

Projecting radially from the axle 50 at uniformly spaced locations longitudinally of the axle are a plurality of radially spaced apart longitudinally distributed spokes 58. Extending between the free ends and extending between the centers of the spokes 58 are longitudinally aligned parallel, radially distributed comminuting members such as cutter wires 60, one or more such wires being provided. This provides a pair of parallel wires connected between each longitudinally aligned group of spokes 58. It can be best seen in FIGS. 3 and 5 six longitudinally aligned rows of spokes 58 are provided at a spacing of 60° apart. In one application of the invention, the spokes are 2 inches apart longitudinally on the shaft 50.

The expression elongated "comminuting member" herein refers to not only a wire but also a rod or even a narrow blade such as a blade having a sharpened leading edge pointed in the direction of movement, e.g., $\frac{1}{8}$ inch thick on its trailing edge and $\frac{1}{4}$ inch wide from leading edge to trailing edge. If a blade is used its width should be not so great that the dough sticks and smears out on the sides. Wire is, however, preferred to a blade because of cost and because little product collects on it. The ends of all of the spokes 58 are in longitudinal alignment with others spaced at different longitudinally separated locations on the axle 50. It will thus be seen that as the motor 56 turns axle 50, the spokes 58 and the wires 60 will slice off successive sheets or layers of dough 14 and thereafter the same or other wires will cut the sheet thus formed into pieces of random size. Accordingly, the cutter wires 60 not only separate pieces from the large dough mass 14, but also subdivides those pieces by cutting them in the comminuting zone beneath solid mass 14 as the material is turned over and over within the hopper 12 below the mass of solid dough 14. This can be best seen in FIG. 5. When the discharge opening is reduced by closing the gate 48, the pieces will stay in the hopper longer and will be reduced to smaller size as they are comminuted more times by the wires 60.

As seen in FIG. 5, the cut pieces 62 fall onto a conveyor such as belt conveyor 70 driven by a drive motor 72 to carry the pieces into a baking oven 74 of a suitable known construction which discharges onto a conveyor 76 that carries the product to sizing and packaging equipment (not shown). The random granules can then be packaged for example in plastic bags and later distributed over the top of a dessert product or the like. They can also be used for forming a crust for a dessert product such as a graham cracker shell. Other applications of the invention will be apparent once the principles are understood.

From the above description it can be seen that the large dough mass is subdivided by first drawing the elongated relatively narrow cutting members or implements comprising wires 60 repeatedly through the surface of the dough mass to remove surface layers and thereafter the elongated cutting elements chop the removed layers repeatedly, subdividing them into pieces. At the same time the lower most wire 60 passes repeatedly over the discharge slot 28 to thereby clear it and thus assure constant delivery through the slot onto conveyor 70. The wires 60 thus have a triple function. First, the separation of the initial surface layer from the dough body 14, second, they subdivide the dough layer into random sized pieces and third, they agitate material immediately over the slot 28 to assure that the slot is clear so that material will continue to move through it.

In a typical application of the invention, the dough granules are about $\frac{1}{4}$ inch to $\frac{3}{8}$ inch in their largest dimension and about 0.8 pounds per square foot as deposited. The wires 60 are at distances of about 1 and 2 inches from the center shaft 50 which turns at 30 rpm. The dough granules are baked for about 20 minutes at 290° F at a rate of about 35 pounds/minute. The product is preferably cooled after baking to about 85° F or cooler to be sufficiently hard for sizing. Pieces larger than 3 mesh are preferably returned for reprocessing.

Thus, the invention provides a process for forming food topping which starts as an edible dough having a plastic consistency. The dough is placed in the container or hopper and the narrow, elongated cutting members are located in position to contact the dough. Layers of the dough are cut sequentially from the surface of the dough stored in the container. These cut layers are allowed to fall into a disintegrating or comminuting zone and there, the layers are repeatedly cut into random sized pieces. These random pieces are allowed to fall from the cutting zone simulating hand feeding to produce a bed of random sized particles which are baked to form friable dough granules.

What is claimed is:

1. An apparatus for providing a crunchy food topping comprising a dough storage hopper, the hopper having an outlet at the bottom thereof, a shaft mounted for rotation in the bottom of the hopper, an elongated narrow cutting member comprising at least one wire supported on the shaft in a position spaced radially therefrom and extending parallel to said shaft whereby rotation of said shaft rotates said cutting member in a circle about the longitudinal axis of said shaft and drive means connected to said shaft to cause the cutting member to repeatedly pass through the lower portion of dough when dough is placed in the hopper thus forming dough granules.

2. The apparatus of claim 1 having means for receiving the cut granules expelled through the outlet and means for baking the granules to provide baked, friable dough granules of random size.

3. The apparatus of claim 1 wherein the outlet is a slot and a slidable gate means is provided for controlling the width of the slot to thereby increase the residence time within the hopper when the size of the slot is reduced whereby the granules are cut to smaller size.

4. The apparatus of claim 1 wherein conveyor means is positioned below the outlet to receive the dough granules discharged therefrom and an oven is operatively associated with the conveyor means to receive the dough granules and to bake the granules.

5. The apparatus of claim 1 having radially extending spokes mounted upon said shaft, said wire being connected between the spokes, both said wire and said spokes serving to comminute the dough as the drive means rotates the shaft.

* * * * *